US006549253B1

United States Patent
Robbie et al.

(10) Patent No.: US 6,549,253 B1
(45) Date of Patent: Apr. 15, 2003

(54) OPTICAL DEVICE (75) Inventors: Kevin J. Robbie, Kingston (CA); Dirk J. Broer, Eindhoven (NL); Michael J. Brett, Edmonton (CA); Jeremy C.-H. Sit, Edmonton (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/436,194

(22) Filed: Nov. 8, 1999

(30) Foreign Application Priority Data

Nov. 9, 1998 (EP) .............................. 98203755

(51) Int. Cl.[7] ......................................... G02F 1/1333
(52) U.S. Cl. ....................................................... 349/84
(58) Field of Search ........................ 349/84, 172, 171, 349/175, 184–186

(56) References Cited

U.S. PATENT DOCUMENTS 4,744,635 A * 5/1988 Takaochi et al. ............ 350/311
5,880,801 A * 3/1999 Scherer et al. ............... 349/124
6,083,314 A * 7/2000 Nakashima et al. ...... 106/287.6
6,122,021 A * 9/2000 Hirai et al. .................... 349/10
6,177,181 B1 * 1/2001 Hamada et al. ........... 428/304.4

OTHER PUBLICATIONS

K. Robiie et al. "Sculptured thin films and glancing angle deposition:Grouwth mechanics and applications", pp. 1460–1465.*
Rovira et al. "Transmission ellipsometry of a thin film helicoidal bianisotropic medium" pp. 1180–1182.*

* cited by examiner

Primary Examiner—William L. Sikes
Assistant Examiner—Dung Nguyen
(74) Attorney, Agent, or Firm—Aaron Waxler (57) ABSTRACT The invention relates to an optical device comprising two substantially parallel substrates with electrode layers on their facing sides for switching an optically active layer which is present between said substrates. Furthermore the present invention relates to a hybrid layer for use in such an optical device. Switching of the layers is enhanced by introducing optically anisotropic material in a porous structure.

3 Claims, 7 Drawing Sheets

OPTICAL DEVICE

BACKGROUND OF THE INVENTION

The invention relates to an optical device comprising two substantially parallel substrates with electrode layers on their facing sides for switching an optically active layer which is present between said substrates. Furthermore the present invention relates to a hybrid layer for use in such an optical device.

Optical devices as mentioned in the opening paragraph are known as such, for instance, in the form of optical shutters or liquid crystal displays.

A severe drawback of the known optical devices is their relatively high switching voltage.

Recently introduced display devices based on cholesteric liquid crystals (CLCs) are still considered limited in capabilities. The major roadblock for realization of the benefits of chiral liquid crystal optical devices and displays has been difficulty in creating sufficient long range alignment of the helical structure in the preferred orientation. Alignment attempts to date have used surface alignment layers on either side of the cell containing the liquid crystal to produce strong alignment at the surfaces. Unfortunately, it has been difficult to control alignment within the bulk of the cell where the liquid crystal prefers to form domain structures separated by unaligned dislocation regions. To achieve good contrast, cell thickness must be increased yet as it is, alignment, and optical properties, degrade.

The present invention aims among others at providing optical devices having a relatively low switching voltage.

In addition, the present invention aims at providing optical devices having sufficient long range alignment of the helical structure and structural control in three dimensions.

This object is achieved in optical device comprising two substantially parallel substrates with electrode layers on their facing sides for switching an optically active layer which is present between said substrates, these optical devices in accordance with the present invention being characterized in that the optically active layer is formed as a hybrid layer containing an optically anisotropic material as well as a porous columnar structure. Wherever in this Application the wording "columnar structure" is mentioned, different kinds of structures are meant, which can be obtained by the method to be described. Such shapes are, for example, helical structures, pillars, slanted pillars, zig-zag, chiral or sinusoidal structures. Especially when using liquid crystal material for the anisotropic material, the presence of said structure results in a lowering of the switching voltage of the optical device.

Here we demonstrate a technique where a liquid crystal material is embedded in an inorganic porous backbone structure to produce strong alignment and structural control in three dimensions. Cell thickness is limited only by difficulties in fabrication of thick films, with 50 μm thickness easily obtainable. In addition, liquid crystal alignment structures can be designed to engineer desired optical responses. For example, the narrow bandwidth of transmission/reflection typical of a CLC cell can be increased by producing a graded pitch structure. With the present method, pitch gradients or other structures can be accomplished with simple software modification to the deposition control system. The pitch can even be reversed within the layer, leading to substantially 100% reflection. Finally, because of the versatility of the present method, all polarization components needed for cell fabrication could be conducted with a small number of deposition steps, all based on the present method, to produce a complete device. While numerous particulars still remain to be investigated, the present method appears to be a promising technique for creating liquid crystal devices for display applications, but also for other components, both active and passive.

OBJECTS AND SUMMARY OF THE INVENTION

The invention also relates to a hybrid layer for use in an optical device, said layer containing an optically anisotropic material as well as a porous columnar structure. Said structure results in a lowering of the switching voltage of the optical device. Preferably the columnar structures comprise helical structures, in which the helixes may have, if wanted, square sides.

Chiral optical devices are used primarily for filtering of circularly polarized light, for example in liquid crystal (LC) displays. Various optical switching techniques based on chiral liquid crystals (CLCs) have been envisaged, with optical properties superior to linear polarization based devices, such as the twisted nematic cells used in the majority of commercial liquid crystal displays. In truth, twisted nematic cells are one type of chiral optical device where the chiral "twist" length is considerably longer than the wavelength of visible light. The chiral optical devices discussed here have twists or pitches comparable to the wavelengths of visible light and operate within the "resonance" regime, corresponding to the "zone of selective reflection" in the CLC literature. Switching with a chiral optical device is based on the phenomenon of circular Bragg reflection, where one of the left- or right-circularly polarized light components is selectively reflected by the helical structure of the chiral material. Circular Bragg reflection arises from constructive scattering of circular polarized light from helical structures, and is fundamentally very similar to constructive interference reflections of plane polarized light from high/low index multilayers, Circular Bragg reflection allows light to be polarized for switching (in display and other photonic applications) without the use of absorbing polarizers, such as those used in linear polarization devices, which reduce power efficiency by absorbing half of the light available for transmission through the device.

The most commonly used chiral optical materials, chiral nematic liquid crystals (CLCs), are composed of nematic (rodlike) molecules with a small asymmetry in shape, or a mix of nematic molecules with an asymmetric additive. The structure of a layer of these molecules can be described as being composed of many sheets with all the rodlike molecules aligned within a sheet, but with a small rotation in orientation from one sheet to the next. The orientation rotates in a helical fashion through the cell, with one full molecular rotation called the pitch, p. Note: the first liquid crystal which displayed this orientation were closely associated with cholesterol and this phase was originally named the "cholesteric" phase. The more accurate name for this phase is "chiral nematic", however, and is the name that will be used in this description. The polarization selection property of CLCs, circular Brag reflection, occurs between $\Sigma_1 = pn_o$ and $\Sigma_2 = pn_e$ where $n_o$ and $n_e$ are the ordinary and extraordinary refractive indices of the locally uniaxial structure. Within this reflection band, right-handed light is reflected from a right-handed helix, and left-handed light is transmitted. Alternatively, left-handed light is reflected from a left-handed helix, and right-handed light is transmitted. Wavelengths outside of the reflection band are transmitted in all polarizations.

The present invention aims at providing a film forming system method that allows for the growth of complex microstructures with predetermined patterns of growth. In addition porosity and optical properties of the shadow sculpted thin film are enhanced by expanding the range of incidence angles of the vapor flux.

Further, the inventors have found to their surprise that rotation of the substrate while it is exposed to an oblique incident vapor flux at polar angles greater than about 80.degree. produces well defined microstructures.

Therefore, in accordance with one aspect of the invention, there is provided a method of sculpting vapor deposited thin films, the method comprising the steps of:

initially exposing a surface of a substrate to a vapor flux at an oblique incident angle to grow a columnar thin film; and subsequently, and while continuing to expose the surface to vapor flux, rotating the substrate about an axis parallel to the plane of the substrate.

In a further aspect of the invention, there includes the step of, while initially exposing the substrate to vapor flux, moving the substrate to alter the direction of growth of the columns, as for example by rotating the substrate about a normal to the surface of the substrate to create a helical film growth. The substrate may then be rotated about an axis parallel to the plane of the substrate to form a cap for the helical thin film growth. In a further aspect, a cap may be formed by exposing the substrate to a vapor flux in conditions of high diffusion length, such that a dense uniform mass is obtained, such as by heating the substrate to nearly the melting point of the material forming the vapor flux.

In a further aspect of the invention, tailored film growths may be obtained by (a) establishing, in a computer, a desired pattern of thin film growth; (b) while exposing a surface of a substrate to a vapor flux at an oblique incident angle, changing the orientation of the surface in relation to the angle of incidence of the vapor flux; (c) providing control signals to the computer indicative of thin film growth on the substrate; and (d) automatically controlling the rate of change of the orientation of the surface in response to the control signals to grow the thin film according to the desired pattern.

In a still further aspect of the invention, there is provided a method of sculpting vapor deposited thin films, the method comprising the steps of exposing a surface of a substrate to a vapor flux at an oblique incident angle; and, at the same time, rotating the substrate about a normal to the surface while maintaining the oblique angle at greater than 80.degree.

The desired pattern of film growth may also be tailored further. For example, a film may be started with a planar film of low porosity by rotating the substrate through exponentially increasing polar angles (zero to near 90.degree.), with rapid azimuthal rotation, and then columns may be grown on the substrate, with or without rotation. In one embodiment of a tailored growth pattern, the substrate is maintained at a constant polar angle while the substrate is repeatedly (a) rotated azimuthally a set number of degrees, for example 90.degree., and (b) held at a constant azimuthal position while the film grows obliquely, but linearly. The result is a helix with square sides in this instance. In general, the number of sides of the helix is 360/.gamma., where .gamma. is the number of the degrees the substrate is rotating during periods of deposition.

Since the deposition rate tends to vary considerably during deposition, to achieve helical growths with constant pitch, the rotation speed may need to be increased and/or decreased during deposition. In addition, by increasing/ decreasing rotation relative to the deposition rate, helices with reduced/increased pitch, or helices with graded pitch may be obtained.

In general, the polar angle during an initial deposition period in which helical microstructures are to be produced should be greater than about 80.degree.

BRIEF DESCRIPTION OF THE DRAWINGS

The present invention will be now described with reference to preferred but not-limiting embodiments, illustrated in the accompanying drawings in which

FIG. 5 shows the molecular formula of the C3M monomer, whereas

DESCRIPTION OF THE PREFERRED EMBODIMENTS

Figure 1:
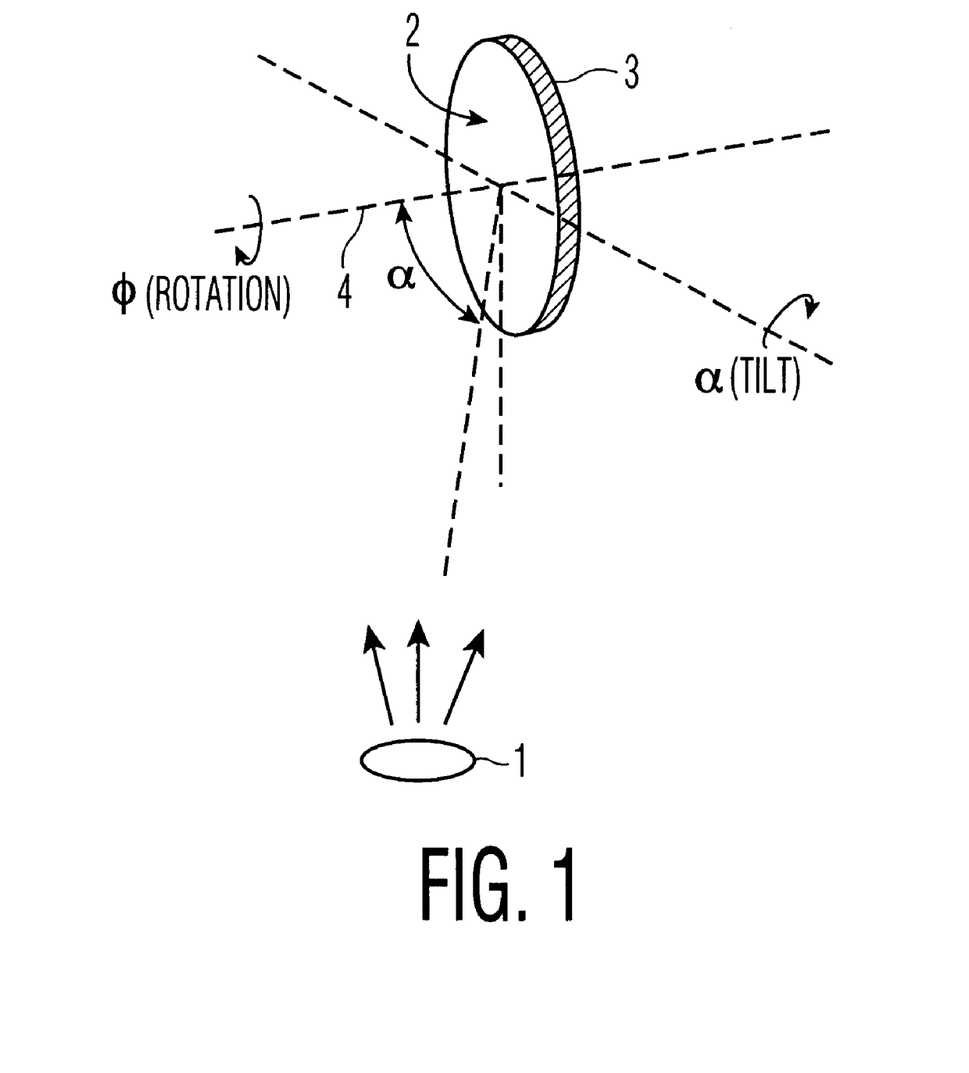
FIG. 1 is a schematic view showing the apparatus for manufacturing the vapor deposited thin films 2 wherein the vapour from a vapour source 1 arrives at a large oblique angle (I) from the substrate normal 4 (I>70°) and the substrate 3 is rotated ($\phi$) continuously during deposition.
Figure 2A:
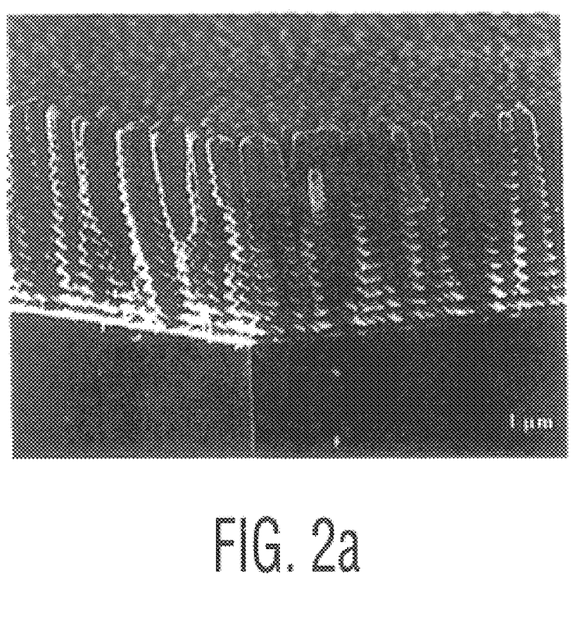
FIG. 2 shows a (1) SEM micrograph of a thin film of $MgF_2$ obtained according to the present invention on glass with 15 helical turns of pitch~350 nm; (b) absolute transmission through the film and substrate for right- and left-circularly polarized light for the as-deposited film, and the film impregnated with water, and the film impregnated with an optically isotropic polymer—SR349; (c) difference spectrum of transmitted right-handed minus transmitted left-handed light for the as-deposited film.

Porous films with a structure composed of helical shaped columns of $MgF_2$ and $SiO_2$ were fabricated according to the present method. Any other suitable material may be used. In this case the method uses a thin film evaporation system with either resistive or electron beam heating of solid source materials to create a vapour of the desired film material within a vacuum environment ($10^{-6}$ torr, $10^{-4}$ Pa). Other deposition methods such as sputtering may be used. As the vapour material condenses onto the substrate, a structure composed of tens of nanometer diameter columns is produced. By tilting the substrate to cause the vapour flux to arrive at a glancing angle (FIG. 1—I>70°), the film columns create shadows where deposition vapour cannot reach. Under conditions of limited surface diffusion of film material (when the substrate temperature, T, is small relative to film material bulk melting temperature, $T_m$—typically $T/T_m<0,3$—both in Kelvin), these shadowed regions become voids in the film and the resulting structure is composed of columns, inclined toward the vapour source, and separated by void regions. The degree of shadowing, and hence porosity, can be controlled very precisely by varying the vapour incidence angle. If the substrate is then rotated during deposition ($\phi$ rotation), a helical structure is formed (FIG. 2a). More complex shapes can be formed quite simply by designing the rotation; $\phi$, and tilt, I as function of deposited film material. A computer based deposition controller has been developed that will accept such a function and fabricated the film structure.

Alone, the helical films fabricated according to the present method are chiral, as can be demonstrated by optical activity measurements. They exhibit optical rotation and circular dichroism as would be predicted from comparisons to other chiral systems including isotropic chiral mediums such as solutions of chiral molecules and CLCs. Limited optical anisotropy and the lack of a switching mechanism limit their use in display applications. It may however be quite possible that chiral films without LC additives could be used as circular polarizer layers in a display application based on the switching properties of hybrid chiral film/LC system.

To investigate the optical response of chiral films impregnated with LCs, circular polarized transmission spectroscopy was performed. An ultraviolet-visible spectrometer was configured with the optical path comprising; light source, depolarizer, linear polarizer, quarter-wave retarder oriented at +/−45° to the linear polarization, sample oriented film side toward light source, depolarizer, and detector. Transmittance was measured for each sample for both right- and left-circular polarizations by changing the orientation of the quarter-wave retarder from + to −45 degrees for the orientation of the linear polarizer. The porous chiral film was impregnated with various materials including: water, optically isotropic polymer, reactive and non-reactive nematic LCs, and a chiral-nematic LC. To impregnate the film, the sample was covered with a thin glass slide held in place with small pieces of tape at two edges. A small drop of the impregnating material was placed at one of the open edges and rapidly filled the porous film as observed by a change in light scattering.

Two films impregnated with various materials will be discussed in this application. The films are quite similar as both films were deposited with vapour incidence angle set to about I=85°, resulting in comparable porosity. The first is shown in the SEM micrograph of FIG. 2a. It is composed of helical columns of $MgF_2$ with a helical pitch of about 350 nm and about 15 turns. The density of similar films was measured with a microbalance mass measurement technique and found to be about 60% of bulk density. The second film discussed is almost identical to the first with a slightly larger pitch.

Figure 2B:
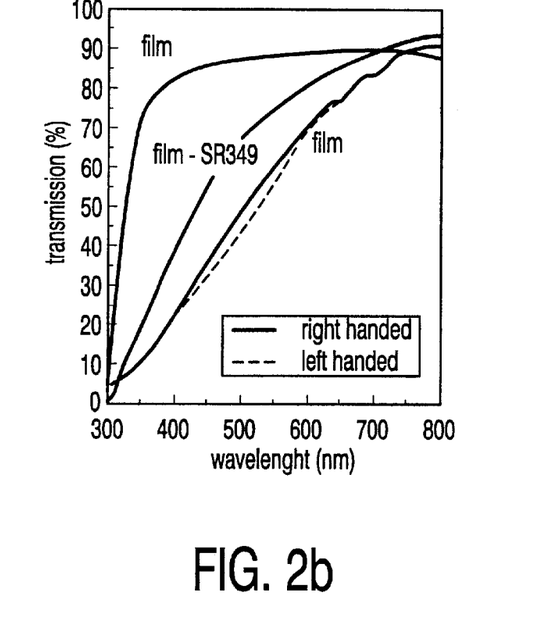
Figure 2C:
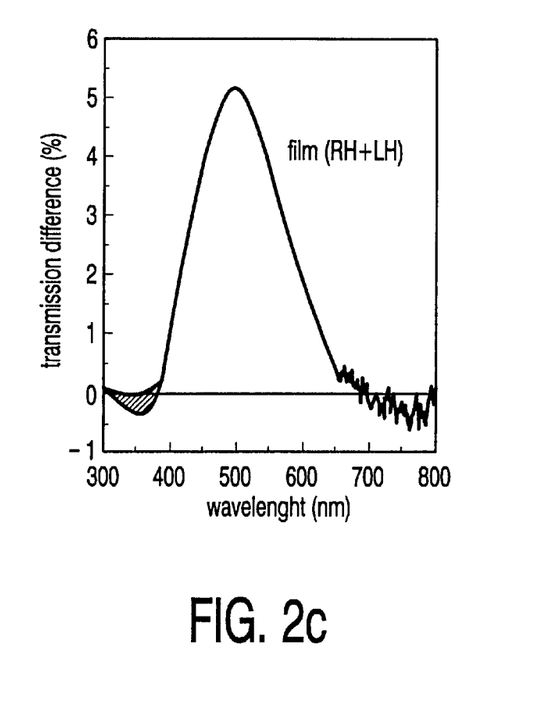

First, the circular polarization transmission of the film without any impregnate was measured and is shown in FIGS. 2b and c. FIG. 2a shows the transmission through the film/substrate system ("film"), as measured, and does not account for interface reflections or absorption in the glass. FIG. 2b is the difference spectrum where the left-handed transmission is subtracted from the right-handed transmission to show the differential effect of the film on the two circular polarizations. The transmission difference has a peak at about 480 nm which corresponds within experimental uncertainty with the estimated peak of $\Sigma=pn_{avg}=350$ nm*1.2=420 nm, where $n_{avg}$ is an effective refractive index of the film which can be estimated as the density (60%) weighted sum of the index of the $MgF_2$ columns (n=1.38) and the index of the air in the voids (n=1.00). The slightly low prediction of peak wavelength could be a result of water absorption within the voids which would tend to increase the effective index and shift the peak wavelength to higher values.

When the film was impregnated with water (n=1.33—chosen to closely match the index of $MgF_2$), all transmission difference was lost, as is shown in FIG. 2a ("film+water"). The difference spectrum shows some structure with differences less than 1%, but it is difficult to tell if there is any real difference or if the observed spectrum corresponds to imperfections in the spectrometer configuration. Water added to the film also allows us to see the degree of scatter arising from the porous structure. The difference between the water and film transmission spectra above 350 nm is attributed to diffuse scattering from inhomogeneities within the film. Absorption is very strong below 350 nm as expected from the glass substrate used. The second impregnating materials tested was ethoxylated bisphenol diacrylate (SR349) which is an optically isotropic polymer that has an index of 1.56 after curing with UV exposure. The transmission spectra are shown in FIG. 2b again ("film+SR349"). Similarly to the water impregnate, no difference between right- and left-handed transmission is seen. Also, transmission reduction from diffuse scatter is less than the film alone, but not as low as for water. This is attributed to the lack of index-matching between the polymer and the film $MgF_2$. From the transmission spectra through the film with and without the optically isotropic impregnates, the present inventors conclude that the chiral optical response seen in the as-deposited film arises from the scattering at the film/air interfaces. When the voids are filed with an index-matching material, the effects disappear.

Figure 3A:
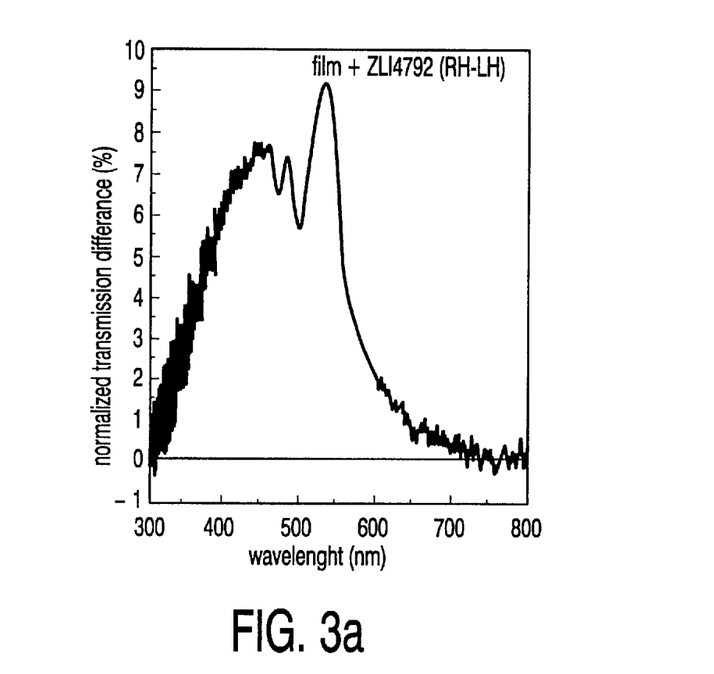
FIG. 3 shows difference spectra for right-handed minus left-handed transmitted light through the film shown in FIG. 2a impregnated with (a) a non-reactive liquid crystal blend—ZLI4792 from Merck, and (b) with a liquid crystal diacrylate—1,4-phenylene bis {4-[3-acryloyloxy) propyloxy]benzoate} or C3M (see FIG. 5)—polymerized at 80° C., wherein the difference has been normalized to the transmittance of the right-handed circular polarized light.
Figure 3B:
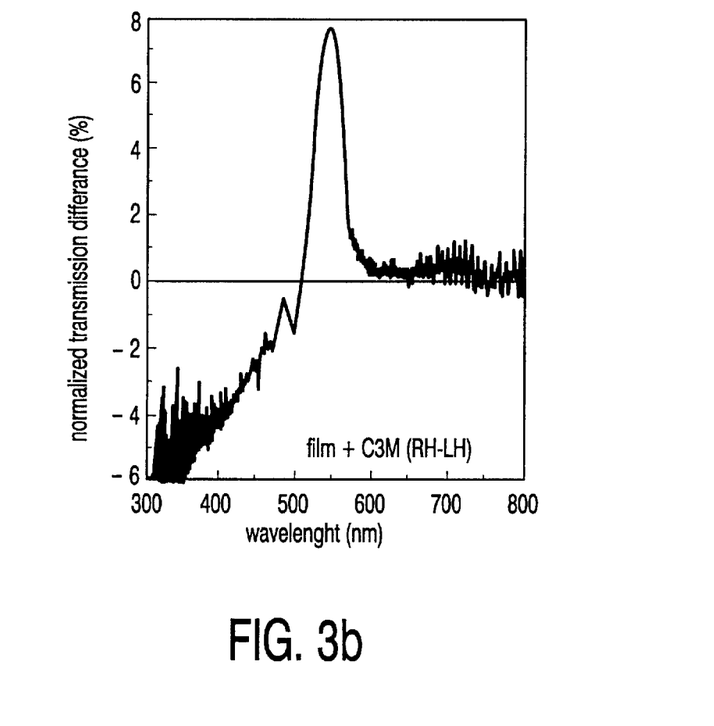
Figure 4A:
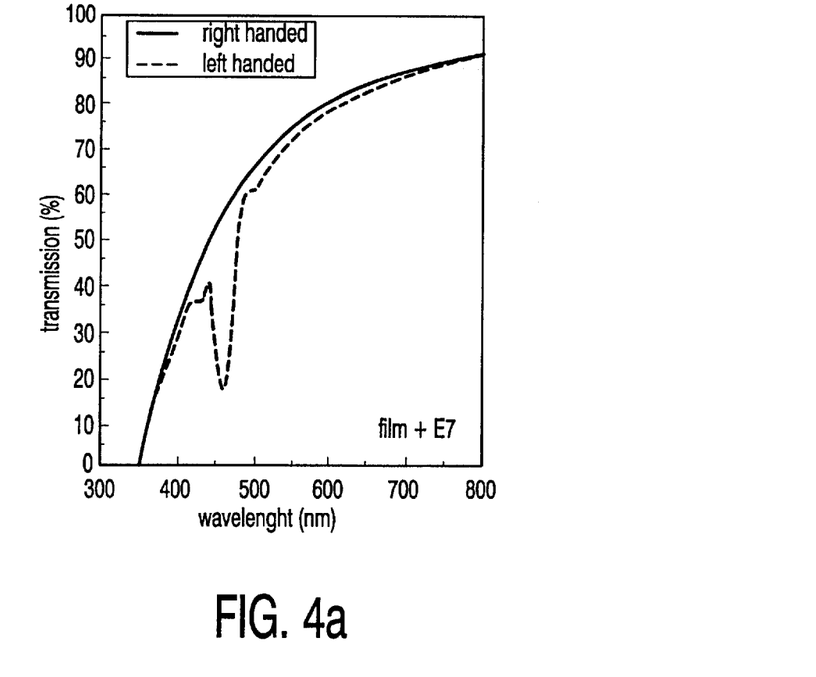
FIG. 4 shows absolute and difference transmission spectra for a film similar to that shown in FIG. 2a impregnated with a liquid crystalline mixture of cyanobiphenyls and cyanoterphenyls. In (b), a calculated spectrum is shown assuming chiral nematic alignment of the liquid crystal within the voids of the film obtained according to the present method.
Figure 4B:
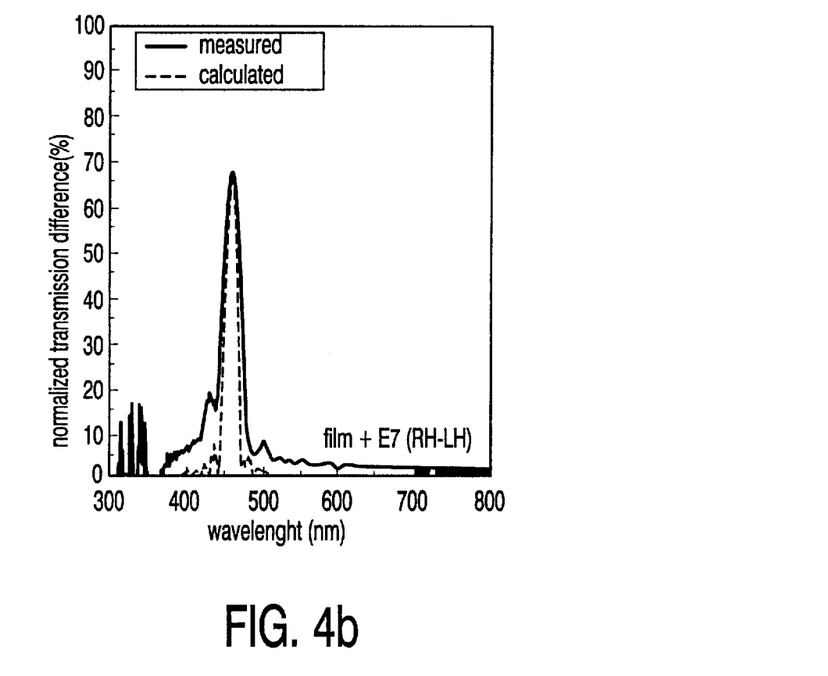
Figure 5:
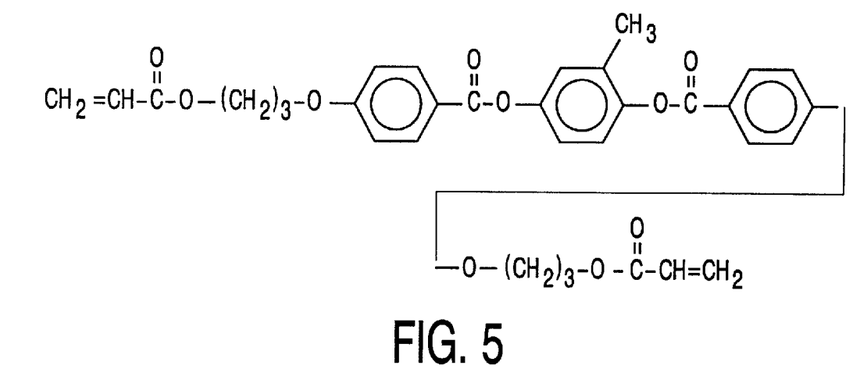

When optically anisotropic impregnates such as liquid crystals are used, there is a remarkable effect. The film shown in FIG. 2a was filled with the LC diacrylate C3M, polymerized at 80° C., and the non-reactive LC blend ZLI4792 (Merck). After polymerization the C3M polymer network has $n_o=1.5488$ and $n_e=1.6880$. The ZLI4792 blend has $n_o=1.479$ and $n_e=1.573$. The second film mentioned above with slightly larger pitch was impregnated with the non-reactive nematic E7 (Merck) with $n_o=1.5$ and $n_e=1.7$. All three of these materials usually exhibit nematic phases at room temperature, and as such have no differential effect on circularly polarized light. The difference spectra for the ZLI4792 and C3M materials impregnated into the film shown in FIG. 2a are shown in FIG. 3, and in this case are normalized to the measured right handed transmission to eliminate diffuse scatter contributions. Absolute transmission was comparable to that observed for the film impregnated with SR249 (shown in FIG. 2b) with the ZLI4792 impregnate exhibiting somewhat higher transmission and the C3M exhibiting somewhat lower. If the LC impregnates are induced into a chiral nematic order by the helical structure of the films obtained by the present method, the circular Bragg reflection will have a maximum at $\Sigma=pn_{avg}$ where $n_{avg}$ is a suitably averaged effective refractive index of the medium. Taking a simple mixing rule of the density weighted sum of the index of $MGF_2$ and the average index of the LCs ($\Sigma_{C3M}=pn_{avg}=350*(0.6*1.38+0.4*(1.5488+1.6880)/2)=520$ nm), the maxima should occur at about 520 nm for C3M and at 500 nm for ZLI4792. Measured transmission difference maxima are within experimental error suggesting that said films induce chiral nematic order in simple nematic LCs. Absolute transmission and normalized transmission difference through the second film impregnated with the nematic E7 is shown in FIG. 4. Here the observed transmission difference is much stronger than that observed with the C3M and ZLI4792 impregnates. Again, the maxima occurs within experimental error with the prediction based on an assumption of chiral nematic order of the LC within the film obtained according to the present method. FIG. 4b shows a calculated curve from equation (1) where the transmission difference peak magnitude and wavelength have been chosen to match the measured spectrum. In matching the measured curve, an average index of $n_{avg}$=1.4275 and an anisotropy $\Lambda$=0.0245 were used. From the simple mixing rule described above, an average index of $n_{avg}$=1.47 can be calculated within experimental error. This optical anisotropy is much less than that of E7 alone ($\Lambda$~0.12).

Figure 6:
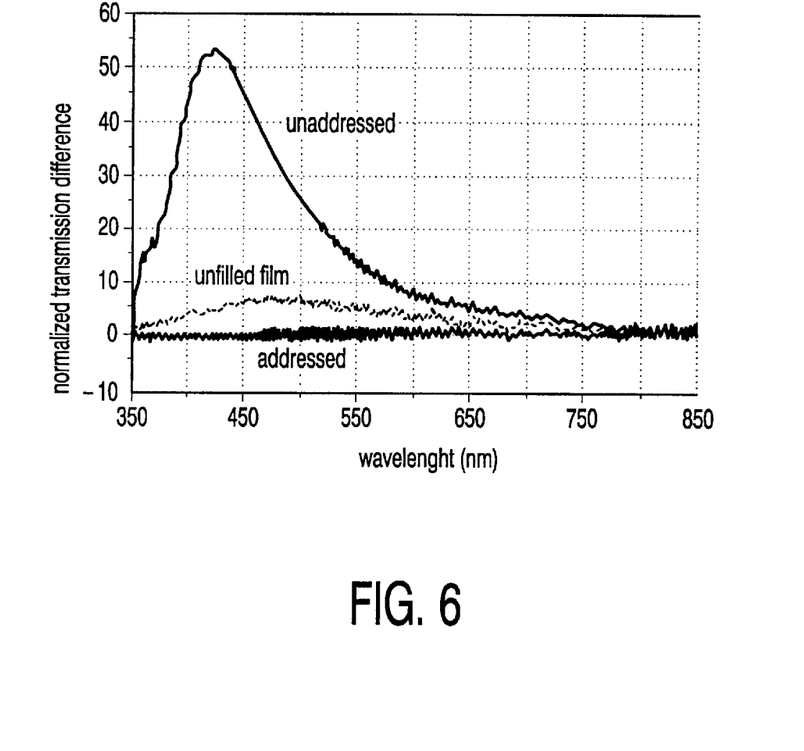
FIG. 6 shows the difference transmission spectra for a film consisting of a chiral film filled with liquid crystals between two electrodes.

In FIG. 6 the switching behaviour of a film according to the invention is shown. It shows the normalized difference transmission spectra for a liquid crystal impregnated chiral film between two transparent electrodes in an addressed state (electric field present) and an unaddressed state (no electrical field or electrical field below threshold field). For comparison the difference transmission spectrum is shown also for an unfilled film, demonstrating the increased optical activity created by filling with liquid crystal material.

The present inventors have demonstrated chiral nematic alignment of liquid crystal materials inside the porous voids of an inorganic structure of $MgF_2$. The structure was fabricated according to the present method of sculpting vapor deposited thin films as described in detail in the present application, employing oblique angle deposition and substrate motion to produce controlled structures on a nanometer scale. Nematic liquid crystal materials impregnating the porous voids within the inorganic structure, composed of helical shaped columns of $MgF_2$, were induced to form a phase very similar to the chiral nematic phase seen in other liquid crystal materials. This was demonstrated with measurements of transmission through the film with right- and left-circular polarized light. Circular polarization selective reflection from the helical structure of the chirally oriented liquid crystal results in differential transmission, in good agreement with theoretical predictions. The materials obtained according to the present invention are described as a promising new technology for the alignment of liquid crystals, suggesting use in display and other photonic switching applications. Possible applications are the use of the hybrid layer as a colour filter. If the twist of the helices is inverted during deposition 100% reflectivity may be obtained.

In transmissive display application multiple reflection bands may be introduced e.g. to pass green light while red and blue are blocked. Reflection may be tuned by changing the helix gradient, porous structure, or imbedded material. Another application exists in pixellated deposition of different colour areas by varying these properties.

Figure 7:
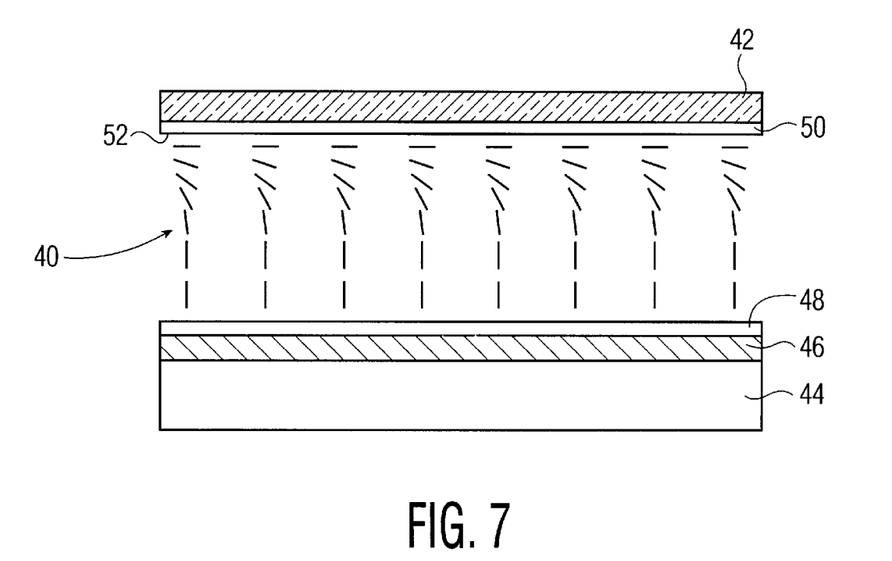
FIG. 7 shows an optical device comprising two substantially parallel substrates with electrode layers on their facing sides for switching an optically active layer.

FIG. 7 shows an optical device 40 comprising two substantially parallel substrates 42,46 with electrode layers 50,48 on their facing sides for switching an optically active layer.

What is claimed is:

1. Hybrid layer for use in an optical device, said layer containing an optically anisotropic liquid crystal material as well as a porous columnar structure, wherein the porous columnar structure comprises a helical structure.

2. Optical device comprising two substantially parallel substrates with electrode layer on their facing sides for switching an optically active layer which is present between said substrates, characterized in that the optically active layer is formed as a hybrid layer containing an optically anisotropic liquid crystal material as well as a porous columnar structure, wherein the porous columnar structure comprises a helical structure.

3. Optical device as claimed in claim 2, where by the presence of said structure results in a lowering of the switching voltage of the optical device.

* * * * *